United States Patent
Uozumi et al.

(10) Patent No.: US 6,840,440 B2
(45) Date of Patent: Jan. 11, 2005

(54) IDENTIFYING SYSTEM OF OVERLAPPED TAG

(75) Inventors: Gakuji Uozumi, Omiya (JP); Osamu Ishihara, Omiya (JP); Tomohiro Mori, Omiya (JP)

(73) Assignee: Mitsubishi Materials Corporation, Tokyo (JP)

( * ) Notice: Subject to any disclaimer, the term of this patent is extended or adjusted under 35 U.S.C. 154(b) by 13 days.

(21) Appl. No.: 10/222,790

(22) Filed: Aug. 19, 2002

(65) Prior Publication Data

US 2003/0057279 A1 Mar. 27, 2003

Related U.S. Application Data

(63) Continuation of application No. 09/581,545, filed as application No. PCT/JP99/06161 on Nov. 5, 1999, now abandoned.

(30) Foreign Application Priority Data

Nov. 11, 1998 (JP) .......................................... 10-320153

(51) Int. Cl.[7] .............................................. G06F 17/00
(52) U.S. Cl. ................... 235/375; 235/380; 235/382.5; 235/486; 235/492; 340/854.6; 340/10.1
(58) Field of Search .................................. 235/375, 380, 235/382, 383, 486, 492; 340/854.6, 10.1, 572.1; 705/18

(56) References Cited

U.S. PATENT DOCUMENTS

| 5,541,399 A | * | 7/1996 | de Vall ........................ 235/491 |
| 5,812,065 A | * | 9/1998 | Schrott et al. ............ 340/10.34 |
| 6,346,884 B1 | | 2/2002 | Uozumi et al. |

* cited by examiner

Primary Examiner—Michael G. Lee
Assistant Examiner—Ahshik Kim
(74) Attorney, Agent, or Firm—Oblon, Spivak, McClelland, Maier & Neustadt, P.C.

(57) ABSTRACT

An identifying system for overlapped tags, wherein one of the tags, e.g., a tag to be appended to an article, has an antenna coil and a radio frequency identification device (RFID) connected to the antenna coil. Two or more resonance capacitors are connected in parallel to each other and in parallel to the antenna coil and two or more switches electrically connect the two or more resonance capacitors to the antenna coil and to the RFID. A control circuit is configured to operate on-off controls of the two or more switches to change a resonance frequency of the identifying system.

3 Claims, 9 Drawing Sheets

IDENTIFYING SYSTEM OF OVERLAPPED TAG

FIELD OF THE INVENTION

The present invention relates to a tag which uses RFID (Radio Frequency Identification: Radio Frequency Identification) technology. Furthermore in detail, it relates to a system which can identify each tag, even if the tags are respectively appended to two or more articles which are overlapped.

DISCUSSION OF THE BACKGROUND

Conventionally, a tag identifying system is known (Japanese Unexamined Patent Publication No. 8-316888) that it has a half duplex communication channel provided between an interrogator and two or more tags which exist within the range of the interrogator and an identification of the tag is not told to the interrogator at first, but the tags are activated when the interrogator polls a signal having a single frequency, and each tag can un-activate itself.

In this tag identifying system, it is constituted so that the first broadcast from interrogator broadcasts the first signal which are used for activating all the tags within the range of the interrogator and the first inquiry message, which contains the first value showing number of the tags within the range of the interrogator.

Since a memory means established for every tag responds the first reference message, an identifying display which is not identified by the interrogator is memorized in a memory.

Moreover, it is constituted so that the first remains tag formation means equipped to every tag responds to a reception of the first reference message performs calculation, which is based on the first value, a random bit for every tag and a memorized identifying display, and when the calculation produces a predetermined corresponding result, by un-activated tags, the first set of activated tags which is formed.

It is constituted so that the tags is un-activated after the first un-activated means which identified the first set of each activated tags changed the identifying display, memorized in the memory of the first set of each tag, showing that an identification is successful with the interrogator.

Moreover, it is constituted so that the second broadcast means carries out the broadcast of the second reference message, which contains the second signal which activates all the tags within a range of an interrogator and the second value which shows an un-identified tag within a range of the interrogator, and the second remaining tag formation means and the second un-activated means form the second set of activated tags by using the second value instead of the first value, the number of identified tags are increased.

Furthermore, it is constituted so that the second broadcast means, the second remaining tag formation means, and the second un-activated means is performed the processing using the inquiry message which has the following signal and the following value, until identification of all the tags within a range of an interrogator finishes.

In the above-described tag identifying system, tags are divided into a small group, and by turning OFF power supply of the tag which does not belong to the group, one group of the tags is identified at once so that a radio power can be saved.

Each tag puts itself into a group by performing calculation from a parameter memorized in itself and a parameter of an interrogator.

However, in the tag identifying system shown in Japanese Unexamined Patent Publication 8-316888 of the former, if two or more tags are overlapped, a mutual inductance may arise between an antenna coil of each tag, and a resonance frequency of the tag may change.

For this reason, whether an interrogator forms an alternative magnetic field in a circumference or oscillates a radio (a radio wave which an un-overlapped tag resonates) the tag resonates from a transceiver antenna of the interrogator, the tag stops oscillating and stops supplying a radio power to a RFID device of the tag.

Consequently, the interrogator had the fault which becomes unable to identify the overlapped tags.

The purpose of the present invention is to offer an identifying system for overlapping tags which can identify the tags certainly whether two or more tags are overlapped or a tag and a metal plate are overlapped.

SUMMARY OF THE INVENTION

A first embodiment of the present invention discloses a tag equipped with a RFID device 16 which is appended to an article 17 and connected to an antenna coil 14, as shown in FIGS. 1 and 2.

The novel composition has two or more resonance capacitors $19a$–$19n$ mutually connected in parallel and connected in parallel with the antenna coil 14, two or more switches $24a$–$24n$ respectively connected with the resonance capacitors $19a$–$19n$, which respectively connect or intercept electrically the resonance capacitors $19a$–$19n$ to the antenna coil 14 and the RFID device 16 and a control circuit 25 which operates on-off controls of the switches $24a$–$24n$, and since the control circuit 25 operates the on-off controls of the switches $24a$–$24n$, a resonance frequency of a resonance circuit including the antenna coil 14 and the resonance capacitors $19a$–$19n$ can be changed.

If two or more tags 11–13 are independent, even if it has the same resonance frequency, when the tags 11–13 are overlapped, it comes to have a resonance frequency which respectively changes with a mutual inductance between the antenna coils 14 of the tags 11–13.

For this reason, even if a radio wave of a frequency to which an independent tag resonates is oscillated to the overlapped tags 11–13, each tag 11–13 can not resonate.

Then, in an identifying system of the tag indicated in the first embodiment, when the control circuit 25 of a tag 11 among two or more overlapped tags 11–13 carries out the on-off control of two or more switches $24a$–$24n$, total capacitance of the resonance capacitors $19a$–$19n$ changes.

The control circuit 25 suspends the on-off controls, when a resonance frequency of the resonance circuit comprising the antenna coil 14 and the resonance capacitors $19a$–$19n$ with the closed switches $24a$–$24n$ becomes almost the same as that of a resonance frequency of the un-overlapped single tag 11.

Since the tag 11 resonates by this procedure, the tag 11 is activated and the tag 11 can be identified.

Concerning other tags 12 and 13, they are identified as well as the above-mentioned procedure. Thus, all the overlapped tags 11–13 are identified one by one for a short time.

A second embodiment of the present invention as shown in FIG. 7 is characterized by two or more leads $57a$–$57n$ whose ends are connected into a winding of an antenna coil 54 with predetermined intervals, and the other ends are connected to a RFID device 56, two or more switches $58a$–$58n$ respectively equipped with the leads $57a$–$57n$ and respectively connected or intercepted electrically to the antenna coil 54 and the RFID device 56 through the leads 57a–57n and the control circuit 25 which closes two or more switches 58a–58n alternatively, and since the control circuit 25 closes the switches 58a–58n alternatively, a resonance frequency of a resonance circuit including the antenna coil 54 and a resonance capacitor 56a in the RFID device 56 can be changed.

In an identifying system of overlapping tags described in the second embodiment, when the radio wave which can oscillate un-overlapped single tag 51 is oscillated toward the overlapped tag 51, even if the tag 51 does not resonate, minute voltage may occur to each tag 51.

A control circuit 25 of the tag 51 operates with the voltage and when the control circuit 25 closes alternatively two or more switches 58a–58b, an inductance of the antenna coil 54 changes.

The control circuit 25 suspends the on-off controls, when a resonance frequency of the resonance circuit comprising the antenna coil 54 and the resonance capacitor 56a becomes almost the same as that of a resonance frequency of the un-overlapped single tag 51.

Since the tag 51 resonates by this procedure, the tag 51 is activated and the tag 51 can be identified. It identifies about other tags as well as the above-mentioned procedure.

Thus, all the overlapped tags 51 are identified one by one for a short time.

A third embodiment of the present invention, as shown in FIG. 8, is characterized by two or more capacitors 77a–77n for capacitance adjustment connected to an antenna coil 74 in series and to each other in parallel, two or more switches 78a–78n respectively connected to the capacitors 77a–77n for capacitance adjustment and respectively connecting or intercepting electrically the capacitors 77a–77n for capacitance adjustment to the antenna coil 74 and a RFID device 76, and a control circuit 25 which caries out on-off controls of the switches 78a–78n, and since a control circuit 25 carries out the on-off controls of the switches 78a–78n, a resonance frequency of a resonance circuit including the antenna coil 74, the capacitors 77a–77n for capacitance adjustment, and a resonance capacitor 76a for resonance in the RFID device 76 can be changed.

In an identifying system of overlapping tags described in the third embodiment, when the radio wave which can oscillate un-overlapped single tag 71 is oscillated toward the overlapped tag 71, even if the tag 71 does not resonate, minute voltage may occur to each tag 71.

A control circuit 25 of the tag 71 operates with the voltage and when the control circuit 25 carries out the on-off controls of two or more switches 78a–78n, total capacitance of the capacitors 77a–77n for capacitance adjustment can be changed.

The control circuit 25 suspends the on-off controls, when a resonance frequency of the resonance circuit comprising the antenna coil 74 and the capacitors 77a–77n for capacitance adjustment of the closed switches 78a–78n and the resonance capacitor 76a becomes almost the same as that of a resonance frequency of the un-overlapped single tag 71.

Since the tag 71 resonates by this procedure, the tag 71 is activated and the tag 71 can be identified. It identifies about other tags as well as the above-mentioned procedure. Thus, all the overlapped tags 71 are identified one by one for a short time.

A fourth embodiment of the present invention discloses a tag equipped with a RFID device 96 for overlapping, in which the tag is appended to an article, and a capacitor 96a for overlapping connected to an antenna coil 94 for overlapping and the antenna coil for overlapping 94 are built, as shown in FIG. 9.

The characteristic composition is that when predetermined number of sheets of tags 91 are overlapped, one of, or both of an inductance of the antenna coil 94 for overlapping and the capacitance of the capacitor 96a for overlapping is/are set up so that a resonance frequency of each overlapped tag 91 is the same as that of a resonance frequency of the un-overlapped single tag 91.

In an identifying system of overlapping tags described in the fourth embodiment, since an inductance of the antenna coil 94 for overlapping and the capacitance of capacitor 96a for overlapping are adjusted so that each tag 91 may resonate when predetermined number of sheets of the tags 91 are beforehand overlapped, if an interrogator oscillates a radio wave of a predetermined frequency to the tags 91 which is beforehand overlapped with predetermined number of sheets, each tag 91 can respectively resonate.

Consequently, the interrogator can identify each tag 91 one by one certainly by communicating with each activated tag 91 which resonates.

A fifth embodiment of the present invention related to the fourth embodiment, and is furthermore characterized by that besides an antenna coil for overlapping, and a RFID device for overlapping, an antenna coil for un-overlapping and a RFID device for un-overlapping which resonate when not overlapped, are prepared.

In an identifying system of overlapping tags described in the fifth embodiment, when the tag is independent, a resonance circuit for independent, including a capacitor for independence built in the antenna coil for independence and the RFID device for independence, resonates and the tag is identified.

On the other hand, when the tags are overlapped, the resonance circuit for overlapping, comprising the antenna coil for overlapping and a capacitor for overlapping, resonates and the tags are identified.

BRIEF DESCRIPTION OF DRAWINGS

Please amend the paragraphs at page 11, line 10 through page 12, line 12 as follows.

DESCRIPTION OF THE PREFERRED EMBODIMENTS

Next, the first embodiment form of the present invention is explained based on the drawings.

Figure 1:
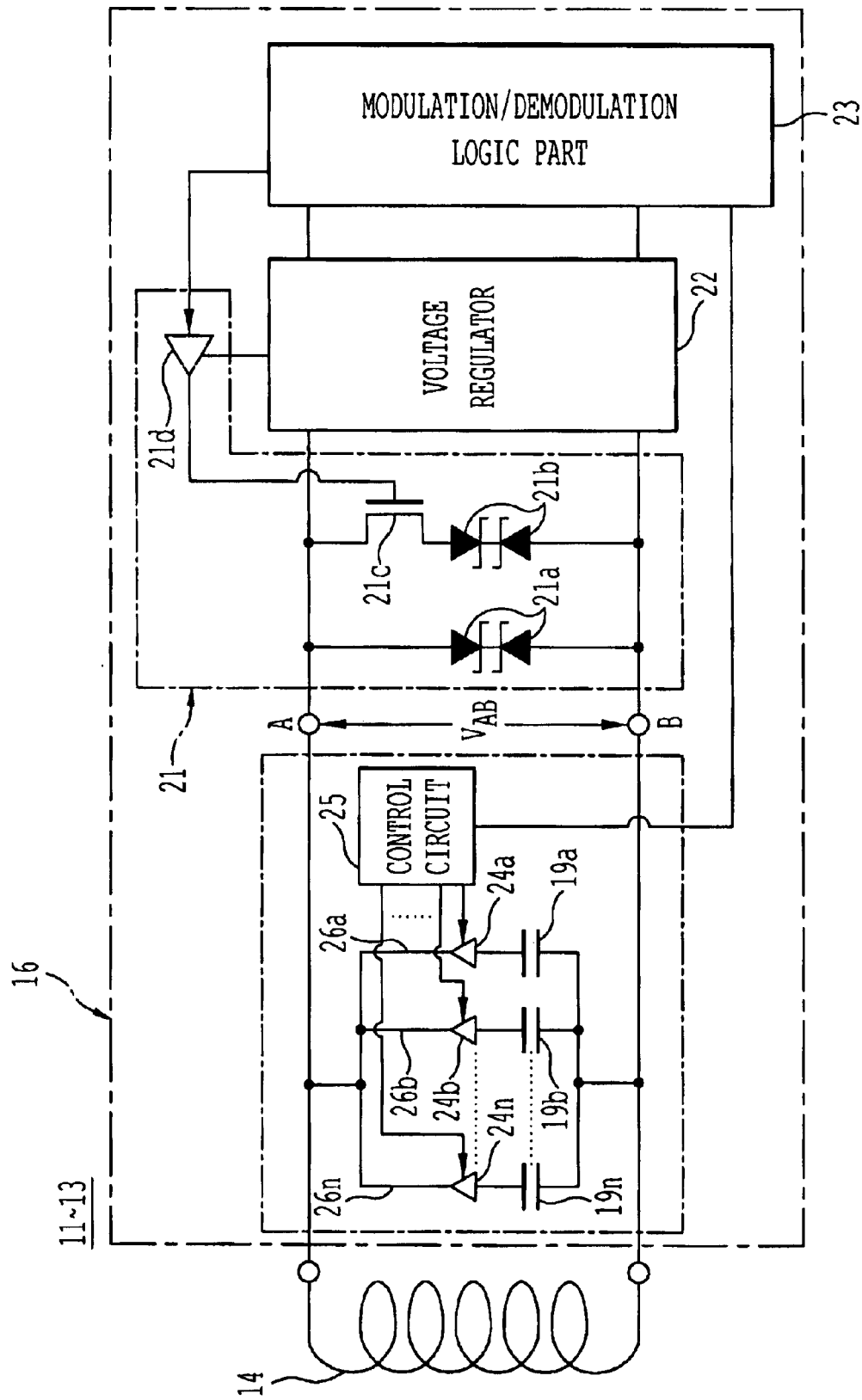
FIG. 1 shows a tag of the first embodiment of the present invention.
Figure 2:
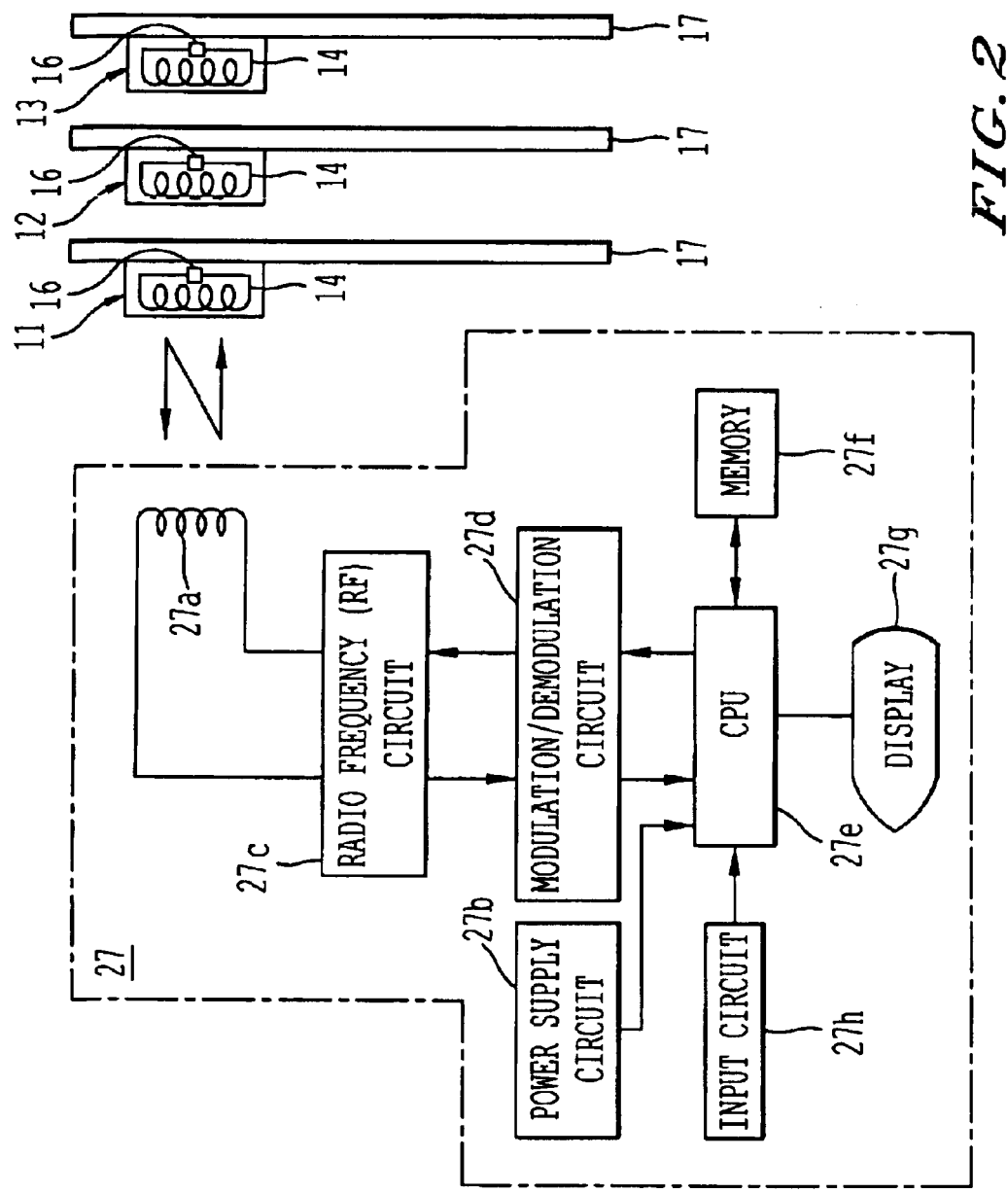
FIG. 2 shows overlapped articles to which tags are appended and an interrogator close to the tags.

As shown in FIGS. 1 and 2, tags 11–13 have a RFID device 16 connected to an antenna coil 14 and the antenna coil 14.

Moreover, in the form of the embodiment, the number of tags 11–13 is three, and they are appended to an article 17 respectively, and the article 17 are overlapped with each other.

Each tag 11–13 is constituted identically.

Figure 3:
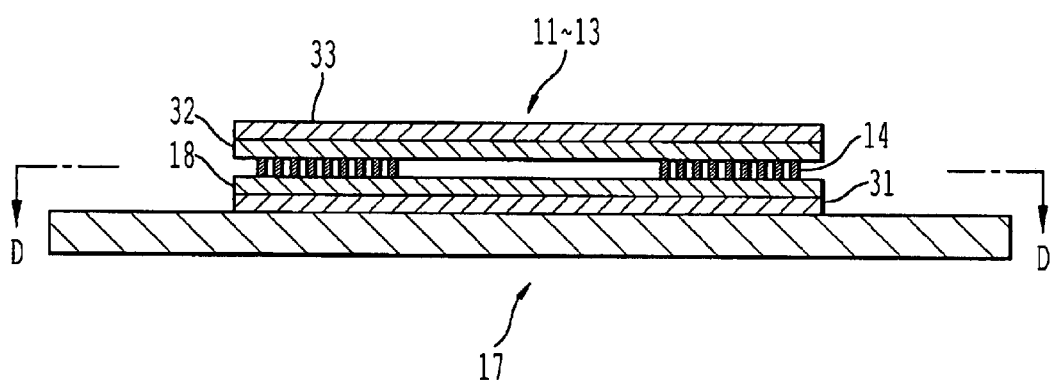
FIG. 3 is a cross-sectional view along the line C—C in FIG. 4 showing a tag appended to an article.
Figure 4:
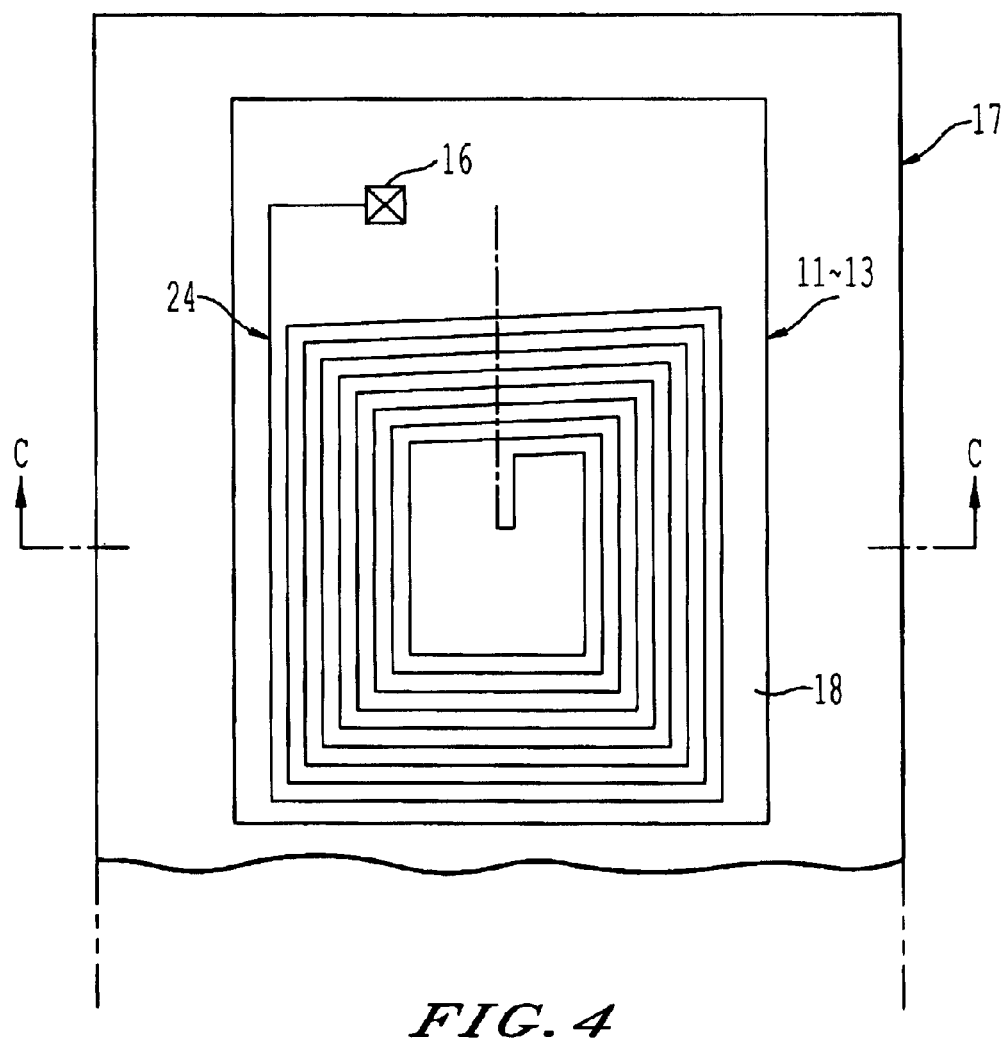
FIG. 4 is a cross-sectional view along the line D—D in FIG. 3.

The antenna coil 14 is formed in the shape of a swirl of an abbreviation square, as shown in FIGS. 3 and 4,
by being swirled an insulated wire and sticking it on a base board 18,
or being removed an unnecessary portion of a conductive material such as aluminum foil and/or copper foil laminated to the base board 18, by an etching method or an piercing method.

The RFID device 16 is appended on the base board 18 (FIG. 4), and has two or more resonance capacitors 19a–19n, an ASK modulation circuits 21, a voltage regulator 22, and an modulation/demodulation logic part 23 (FIG. 1).

Two or more resonance capacitors 19a–19n of each other are connected in parallel and in parallel with the antenna coil 14.

Moreover, two or more switches 24a–24n which respectively connect or intercept the capacitors electrically to the antenna coil 14 and the RFID device 16 are connected to two or more resonance capacitors 19a–19n, and on-off controls of the switches is carried out by a control circuit 25.

Specifically, by connecting each above-mentioned switch 24a–24n in series to each resonance capacitor 19a–19n respectively, the first series circuits to the n-th series circuits 26a–26n are respectively constituted.

Each switches 24a–24n is constituted so that the first series circuits to the n-th series circuits 26a–26n can be opened/closed with a signal from the control circuit 25, respectively.

It is constituted so that total capacitance of the resonance capacitors 19a–19n changes
by operating the on-off control of each above-mentioned switch 24a–24n with the control circuit 25,
and a resonance frequency of a resonance circuit comprising the antenna coil 14 and resonance capacitors 19a–19n with the closed switches 24a–24n, can be changed into a resonance frequency of a un-overlapped single tag 11–13.

In the present embodiment form, it is set up so that a resonance frequency of the resonance circuit, comprising the resonance capacitors 19a–19n whose switches 24a–24n are all closed and the antenna coil 14, becomes not more than a resonance frequency of the un-overlapped single tag 11–13 (0.5 to 1 times of a resonance frequency of the un-overlapped tag).

That is, before identifications of the tags 11–13 by an interrogator 27 mentioned later, all the switches 24a–24n are set as a state of being closed.

Moreover, at the time of manufacturing, although the capacitance of each above-mentioned resonance capacitor 19a–19n is preferable to be set up respectively according to the amount of shifts of a resonance frequency by overlapping tags 11–13, it may be set up identically.

On the other hand, in the present embodiment form, the RFID device 16 does not have a battery.

For this reason, among the resonance capacitors 19a–19n, when the antenna coil 14 receives a radio wave of specific resonance frequency, a voltage produced by an electromagnetic inductance is impressed to the resonance capacitors 19a–19n with the closed switches 24a–24n.

It is constituted so that the voltage impressed to the resonance capacitors 19a–19n with the closed switches 24a–24n is rectified and stabilized by a voltage regulator 22 and supplied to the modulation/demodulation logic part 23, and thereby, tags 11–13 are activated.

Moreover, a memory (not shown) which memorizes data peculiar to an article is prepared in the modulation/demodulation logic part 23.

The memory is a ROM (read only memory), a RAM (random-access memory), or a nonvolatile memory and so on, and is constituted so that under a control of the modulation/demodulation logic part 23, while data memorized is read according to a read command by data communications of a radio wave from the interrogator 27, a writing of data is performed according to a write command from the interrogator 27.

Moreover, an ASK modulation circuit 21 is a circuit which modulates an amplitude of voltage and comprising;
a pair of the first zener diode 21a connected in parallel with a capacitor 19,
a pair of the second zener-diode 21b connected in parallel with the pair of the first zener diode 21a,
a modulation switch 21c connected in series with the pair of the second zener-diode 21b and an operational amplifier 21d which carries out on-off of the modulation switch 21c.

It is constituted so that a signal from the modulation/demodulation logic part 23 is amplified by the operational amplifier 21d, and an on-off control of the modulation switch 21c is carried out by the amplified signal.

It is constituted so that if the modulation switch 21c turns on, the voltage supplied to the antenna coil 14 is restricted to predetermined value (for example, 3V), and if the modulation switch 21c turns off, the voltage supplied to the antenna coil 14 is restricted to predetermined value (for example, 9V).

In addition, instead of the ASK modulation circuit 21, a PSK modulation circuit (frequency modulation) or a FSK modulation circuit (phase modulation) may be used.

An envelope of registered mail in which only a bill (not shown) is enclosed, for example is exemplified as the article 17.

In this case, in the memory of the RFID device 16, data, such as the amount of money of the cash enclosed with the envelope, a post office and a carrier name which relayed conveyance of the envelope, or the date and time on which the envelope arrived or left for, is memorized.

In addition, a mark 31 of FIG. 3 is the first adhesives layer for sticking the base board 18 on the surface of an article 17, a mark 33 is a cover layer which covers the antenna coil 14 on the base board 18 and the RFID device 16, furthermore, a mark 32 is the second adhesives layer for sticking the cover layer 33 on the base board 18.

On the other hand, the interrogator 27 which identifies tags 11–13 is a RFID controller and have a transceiver antenna 27a, a power supply circuit 27b, a Radio Frequency (RF) circuit 27c and an modulation/demodulation circuit 27d.

Moreover, a memory 27f, a display 27g, and a 27h of input means are connected to a CPU 27e of the interrogator 27.

In addition, in the embodiment form, although three sheets of tags appended on the articles are overlapped, two or four or more sheets of tags can be overlapped appended on the articles.

Moreover, one or two or more sheets of tags may be overlapped on one or two or more sheets of metal plates.

In this case, the metal plate is aluminum foil stuck on the article or coins enclosed with the envelope.

Moreover, although the RFID device which does not have a battery is exemplified in the embodiment form, the RFID device which has a solar battery or others is also available.

Thus, an example of procedure on the identification of a is explained.

In the example, the articles 17 are three envelopes of registered mails in which bill is enclosed, and tags 11–13 are appended on the articles 17, respectively.

The data (the amount of money of the cash enclosed with the envelope, a post office and a carrier name which relayed conveyance of the envelope, or the time and date on which the envelope arrived or left off) peculiar to the articles is memorized by the memories of the RFID devices 16 of tags 11–13.

In the state where three envelopes 17 to which the tags 11–13 appended respectively are overlapped, i.e., in the state where three envelopes 17 are made into the bunch, if a radio wave of a predetermined frequency is oscillated from the interrogator 27, a mutual inductance arises among the antenna coil 14 of each tag 11–13 and a resonance frequency of each tag 11–13 changes.

Namely, an self-inductance of each tag 11–13 is changed apparently by the mutual inductance of each tag 11–13, a inductive electromotive force generated to the both ends of the antenna coil 14 becomes to be insufficient to activate-the RFID device 16.

For example, although not illustrated, considering a RLC circuit connecting a resistance and the capacitor respectively to the antenna coil in parallel, and setting a self inductance L of the antenna coil to be 770 mH, a copper loss r of the antenna coil to be 700 Ω, a capacitance C of the capacitor to be 210 pF and a resistivity R of the resistance to be 60 kΩ, a resonance frequency f1 of a RLC circuit can be found from the following formula;

$$f1=(½\pi)[1/(LC)-\{1/(CR)\}2]^{½}=125 \text{ (kHz)}.$$

On the other hand, overlapping the two same RLC circuits as the above, a resonance frequency f2 of the RLC circuit becomes less than f1 and can be found from the following formula;

$$f2=(½\pi)[1/\{(L+M)C\}-\{1/(CR)\}2]^{½}=96 \text{ (kHz)}$$

That is, the self inductance L increases to (L+M).

In addition, the distance between the two antenna coils is set to be less than 1 mm, a mutual inductance M of two antenna coils in this case is 5.1 mH.

The copper loss r does not affect the resonance frequencies f1 and f2.

However, since a certain amount of voltage VAB occurs among A-B of each tag 11–13 (FIG. 1) even if each tag 11–13 does not resonate, the voltage is accumulated and the control circuit 25 is driven.

The interrogator 27 communicates with the tag 11 first.

In the memory of the control circuit 25 (not shown), the minimum voltage V0 between A-B which can activate a tag 11 is memorized, that is, the minimum voltage V0 between A-B when the tag 11 resonates is memorized.

The control circuit 25 compares the signal (actual voltage VAB between A-B) and the voltage V0 from the modulation/demodulation logic part 23, and if it becomes VAB<V0, it opens the switch 24a toward the switch 24n in order, and the total capacitance of resonance capacitors 19a–19n is decreased.

And when it becomes to VAB≧V0, the control circuit 25 suspends the on-off controls of the switches 24a–24n.

At this time, the tag 11 resonates on a radio wave which the interrogator 27 oscillates.

On the other hand, the radio wave (a polling signal) oscillated from the interrogator 27 is a digital signal formed into 2 value.

The digital signal is emitted from a signal generator (not shown) of the interrogator 27, superimposed on the carrier of a predetermined frequency by a modulation/demodulation circuits 27d, namely, the digital signal is modulated.

In the Radio Frequency (RF) circuit 27c, the modulated signal is amplified and oscillated from the transceiver antenna 27a.

The ASK (amplitude modulation), the FSK (frequency modulation), or the PSK (phase modulation) are available to the modulation.

The interrogator 27 reads the peculiar information memorized by the memory of the RFID device 16 of the resonating tag 11.

Namely, due to the resonance of the predetermined tag 11, the voltage produced by the electromagnetic induction is impressed to the capacitor 19, the voltage regulator 22 rectifies and stabilizes this voltage, and supplies to the modulation/demodulation logic part 23.

At the same time, it activates the RFID device 16, only a signal required for a demodulation is derived by the modulation/demodulation logic part 23, the polling signal of the original digital signal is made to reproduce, and the data of the envelopes 17 including the enclosed amount of money peculiar to an envelope 17 derived from the memory, is oscillated to the interrogator.

An oscillation of this data formed into 2 value, for example, the enclosure amount of money is performed by amplifying and modulating with the ASK modulation 21 of the RFID device 16, and oscillating from the antenna coil 14.

Next, at the interrogator 27 receiving the data, the peculiar information on the concerned envelope 17 can be checked by the display 27g.

When writing a predetermined information in the memory of the RFID device 16 of the tag 11, the data to be written, (for example, time and a post office name in which the check is performed, i.e., the time and the post office in which contents about the envelope in the tag is read, etc.), are inputted by input means 27h, and oscillated to the tag 11.

The data is written in the memory of the RFID device 16.

If the writing to the memory of the RFID device 16 of the tag 11 is completed, a signal is sent to the control circuit 25 from the modulation/demodulation logic part 23 of the tag 11, all the switches 24a–24n are closed.

Next, the interrogator 27 communicates with the tag 12 by the above-mentioned procedure, if the writing to the memory of the RFID device 16 of the tag 12 is completed, a signal is sent to the control circuit 25 from the modulation/demodulation logic part 23 of the tag 12, all the switches 24a–24n are closed.

Furthermore, the interrogator 27 communicates the remaining tag 13 by the above-mentioned procedure, if the writing to the memory of the RFID device 16 of a tag 13 is completed, a signal is sent to the control circuit 25 from the modulation/demodulation logic part 23 of the tag 13, and all the switches 24a–24n are closed.

Thus, all the overlapped tags 11–13 are identified one by one for a short time.

In addition, with the present embodiment form, although only a bill is enclosed with the envelope 17, a metal plate, such as a coin also can be enclosed with the envelope 17.

In this case, although a resonance frequency of each tag 11–13 changes to different value of the above, since the control circuit 25 opens sequentially the switches 24a–24n of each tag 11–13 from the switch 24a to the switch 24n and decreases the total capacitance of a resonance capacitors 19a–19n, when the voltage between A-B is set to VAB≧V0, the tag is resonated by the radio wave to which the interrogator 27 oscillates.

Figure 5:
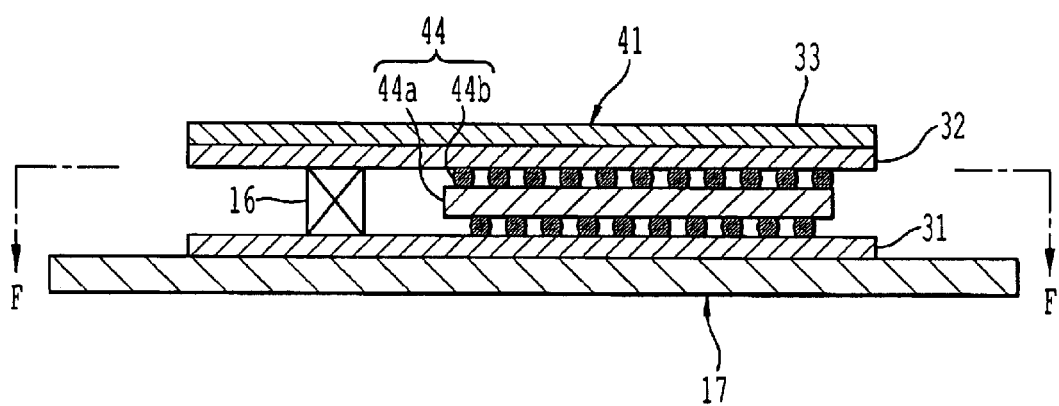
FIG. 5 is a cross-sectional view along the line E—E in FIG. 6 showing a tag appended to an article of the second embodiment of the present invention.
Figure 6:
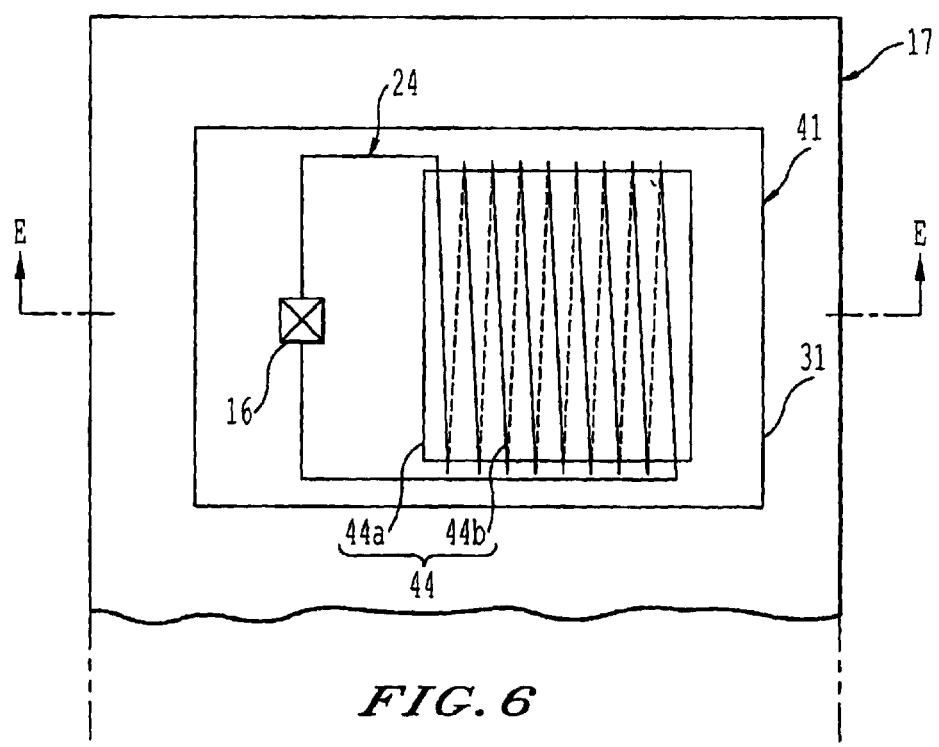
FIG. 6 is a cross-sectional view along the line F—F in FIG. 5.

FIGS. 5 and 6 show the second embodiment form of the present invention.

In FIGS. 5 and 6, the same marks as in FIGS. 3 and 4 show the same parts.

In the present embodiment form, it has a magnetic material 44a from which the antenna coil 44 serves as magnetic core, main part of coil 44b wound around the magnetic material 44a.

As for the form of magnetic material 44a, a plate, a cylinder, a solid prism, a hollow cylinder, etc. may be used.

As the hollow cylinder may be one in which the cylinder is formed by an assembling a plurality of arc-shaped pieces, or one in which the cylinder is formed by a thin film or foil.

Moreover, as the magnetic material 44a, (1) a laminating object having a plurality of thin films or thin boards of a soft magnetic metal and a plurality of insulating thin films or thin boards alternatively overlapped, or a laminating object in which a plurality of thin films or thin boards of the soft magnetic metal are overlapped such that the surface thereof are insulated, (2) a compound material, made of a powder or flake of the soft magnetic metal and a plastic, (3) a compound material, made of the powder or flake of the soft magnetic metal, a powder of a ferrite and the plastic, (4) a compound material made of the powder of the ferrite and the plastic and (5) a sintered ferrite etc. can be exemplified.

In the above-mentioned (1)–(5), when a magnetic permeability does not change with surrounding temperature and an antenna coil constitutes a resonance circuit whose resonance frequency does not change, it is preferable to use a soft magnetic metal as a magnetic material.

As the soft magnetic metal thin film of the above-mentioned (1), it is preferable to use a film with a thickness of 5–250 micrometers made of an iron base amorphous, a cobalt base amorphous, a permalloy or a silicon steel, as the insulating thin film and preferable to use an insulating resin film with a thickness of 5–50 micrometers made of a polyester film, a poly vinylidene chloride, a poly vinyl chloride, a polyethylene terephthalates (PET).

Moreover, an insulated paper is sufficient as the insulating thin film.

As the powder of the soft magnetic metal of above-mentioned (2) or (3), it is preferable to use a carbonyl iron powder or a reduced iron powder with a diameter of 0.1–30 micrometers.

Furthermore, it is preferable to use the flake of the soft magnetic metal made of the iron, the permalloy and the amorphous alloy, etc. are divided by the atomize method, and are obtained by mechanically fabricating the soft magnetic metal powder to be flat with a thickness of 0.1–10 micrometers.

It is constituted identically to the first embodiment form except the above-mentioned matter.

Thus, unlike the tag of the first embodiment form, the constituted and overlaped tag 41 has the feature that a mutual inductance with other tag 41 or a metal plate is small, when overlaped on other tags 41 or the metal plate.

In addition, since the identifying system of the overlaped tag is the same with that of the form the first embodiment form, an explanation is omitted.

Figure 7:
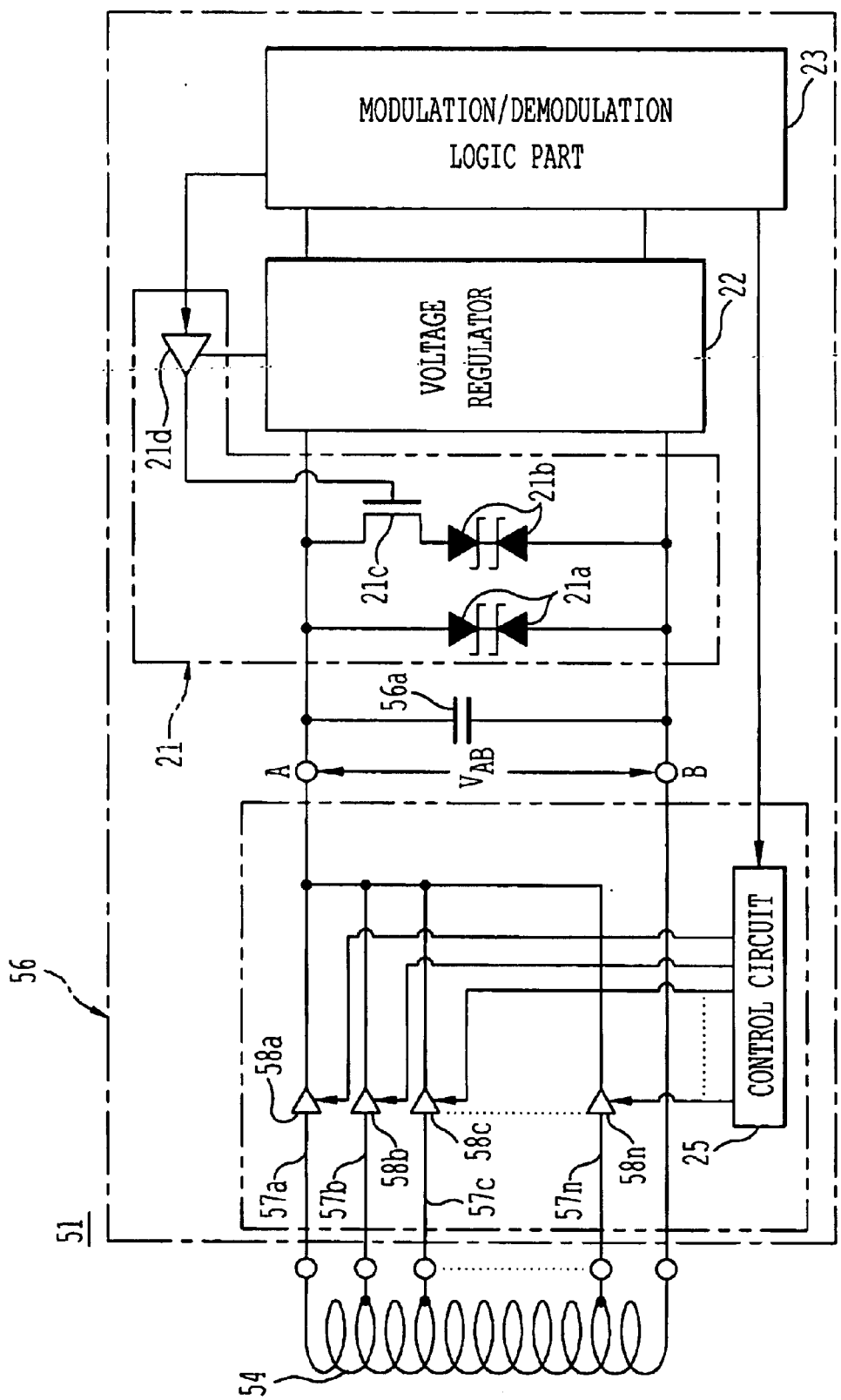
FIG. 7 shows a circuit corresponding to the third embodiment of the present invention.

FIG. 7 shows the third embodiment form of the present invention.

In FIG. 7, the same marks as in FIG. 1 show the same parts.

In the embodiment form, it is constituted so that the other ends of n leads 57a–57n, whose ends are connected with predetermined intervals to the winding of an antenna coil 54, are connected to a RFID device 56, n switches 58a–58n are respectively prepared in the leads 57a–57n, the control circuit 25 closes n pieces of the switches 58a–58ns alternatively.

The ends of n leads 57a–57n are connected to the antenna coil 54 for every 1/n of the antenna coil.

Moreover, it is constituted so that each switches 58a–58n prepared in leads 57a–57n and connects or intercepts electrically the antenna coil 54 and the RFID device 56, respectively.

It is constituted so that since the control circuit 25 closes each above-mentioned switches 58a–58n alternatively, an inductance of the antenna coil 54 changes, a resonance frequency of a resonance circuit comprising the antenna coil 54 and a resonance capacitor 56a in the RFID device 56, becomes a resonance frequency of the un-overlapped single tag 51.

In the present embodiment form, it is set up so that when switch 58a is only closed among the n switches 58a–58n, a resonance frequency of the resonance circuit, comprising the antenna coil 54 and the resonance capacitor 56a becomes not more than a resonance frequency of the un-overlapped single tag 51 (0.5–1 times to a resonance frequency of the un-overlapped tag).

That is, before identification of the tag 51 by the interrogator, it is set as the state where only the switch 58a closes and other switches 58b–58n open, respectively.

Although the ends of n leads 57a–57n are connected for every 1/n of the total number of turns of the antenna coil 54, it may be connected changing respectively, according to the amount of shifts of a resonance frequency by overlapping of the tag 51

It is constituted identically to the first embodiment form except the above-mentioned matter.

Thus, an example of a system by which a constituted tag is identified, is explained.

In respect to each tag 51, before the control circuit 25 operates, since only the switch 58a closes, if the tags 51 are overlapped and a radio wave of a predetermined frequency is oscillated from the interrogator, as same in the first embodiment form, a mutual inductance arises among the antenna coils 54 of each tag 51, and a resonance frequency of each tag 51 changes.

Namely, an self-inductance of each tag 51 is changed by the mutual inductance of each tag 51, and a inductive electromotive force generated to the both ends of the antenna coil 54 becomes to be insufficient to activate the RFID device 56.

However, even if each tag 51 does not resonate, since a certain amount of voltage VAB occurs among A-B of each tag 51 (FIG. 7), the voltage is accumulated to drive the control circuit 25.

The interrogator communicates with one tag 51 in two or more tags 51.

In the memory of the control circuit 25 (not shown), the minimum voltage V0 between A-B to activate the tag 51, that is, the minimum voltage V0 between A-B when the tag 51 resonates is memorized.

The control circuit 25 compares a signal from the modulation/demodulation logic part 23 (actual voltage VAB between A-B) and the voltage V0, and if it becomes VAB<V0, it opens the switch 58a and change the state into the state where only the switch 58b is closed, and reduces the number of turns to which the current of the antenna coil 54 flows.

Even in this case, if it becomes VAB<V0, it opens the switch 58b and changes into the state into where only the switch 58c is closed, furthermore, reduces the number of turns to which the current of the antenna coil 54 flows.

Performing this procedure in order, when it is set to VAB>=V0, the control circuit 25 suspends on-off controls of the switches 58a–58n.

At the time, a tag 51 resonates with a radio wave which is oscillated by the interrogator.

As the same with the first embodiment form, the interrogator writes a predetermined matter in the memory, after reading the peculiar information memorized in the memory of the RFID device 56 in the resonated tag 51.

If the writing to the memory of the tag 51 is completed, a signal is sent to the control circuit 25 from the modulation/demodulation logic part 23 of the tag 51, the closed switch is opened, the only opened switch 58a is closed and it returns to the first state.

Next, the interrogator communicates with another tag by the above-mentioned procedure, if the writing to the memory of the RFID device of the tag is completed, a signal is sent to the control circuit from the modulation/demodulation logic part of the tag and it returns to the first state.

Thus, all the overlaped tags 51 are identified one by one for a short time.

In addition, it may be changed the state into the state where all the switches of the tags whose communications are completed, are opened.

In addition, in the present embodiment form, a metal plate, such as coin may be enclosed with an envelope which is an article.

In this case, although a resonance frequency of each tag is changed to the different value from the above-mentioned value, since the control circuit closes the switch of each tag alternatively and the inductance of the antenna coil is changed (reduction or increase), when the voltage between A-B is set to VAB≧V0, the tag resonates with a radio wave which the interrogator oscillates.

Figure 8:
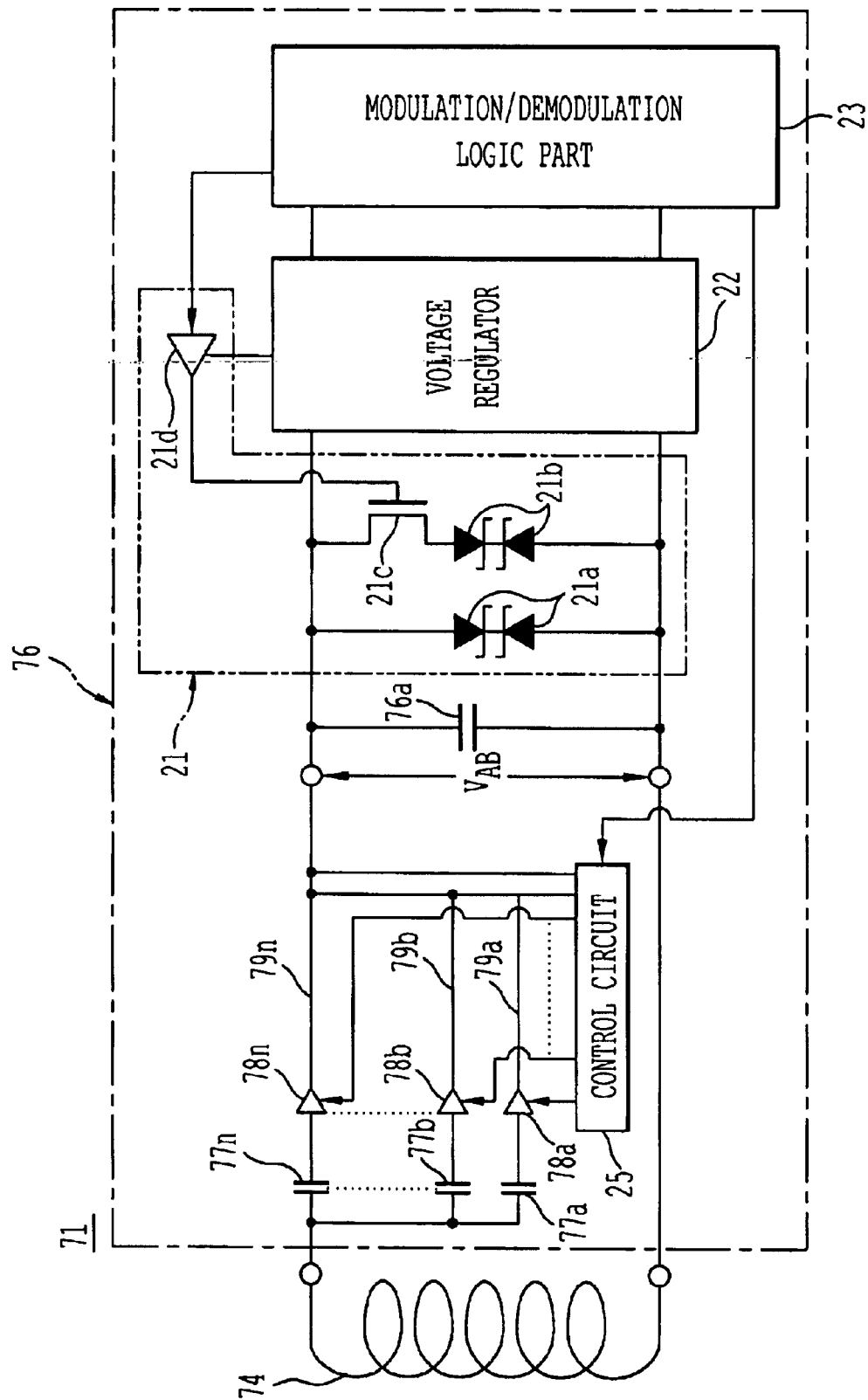
FIG. 8 shows a circuit corresponding to the forth embodiment of the present invention.

FIG. 8 shows the forth embodiment of the present invention.

In FIG. 8, the same marks as FIG. 1 show the same parts.

In the present embodiment form, it is constituted so that two or more capacitors 77a–77n for capacitance adjustment are connected to an antenna coil 74 in series and connected each other in parallel, two or more switches 78a–78n are respectively connected to the capacitors 77a–77n for capacitance adjustment, furthermore, the control circuit 25 may carry out on-off controls of the switches 78a–78n.

It is constituted so that the switches 78a–78n are connected or intercepted electrically two or more capacitors 77a–77n for capacitance adjustment to the antenna coil 74 and the RFID device 76, respectively.

Concretely, since each above-mentioned switch 78a–78n is respectively connected to each capacitor for capacity adjustment 77a–77n in series, the first series circuits to the n-Th series circuits 79a–79n are constituted, respectively.

Each switch 78a–78n is constituted so that the first series circuits to the n-Th series circuits 79a–79n may be opened and closed with a signal from the control circuit 25, respectively.

Moreover, a resonance capacitor 76a is prepared in the RFID device 76.

It is constituted so that since the control circuit 25 carries out the on-off control of each above-mentioned switch 78a–78n, the total capacitance of the capacitors 77a–77n for capacitance adjustment changes, and the resonance frequency of a resonance circuit comprising the antenna coil 74, the capacitors 77a–77n for capacitance adjustment with the closed switches 78a–78n and the resonance capacitor 76a can be changed to be the resonance frequency of an un-overlaped single tag 71.

In the present embodiment form, it is set up so that a resonance frequency of the resonance circuit, comprising the antenna coil 74, the capacitors 77a–77n for capacitance adjustment with the closed switches 78a–78n and the resonance capacitor 76a may become not more than a resonance frequency of the un-overlaped single tag 71 (0.5–1 times of a resonance frequency of the un-overlapped tag).

That is, before an identification of the tag 71 by the interrogator, the switches 78a–78n are set to the state where all are closed.

Moreover, the total capacitance of the capacitors 77a–77n for capacitance adjustment is set up more greatly than the capacitance of the resonance capacitor 76a.

For example, when the capacitance of the resonance capacitor 76a is set to 210 pF, it is preferable for the total capacitance of the capacitors 77a–77n for capacitance adjustment to be set up to about 10,000 pF.

In this case, since the total capacitance of the capacitors 77a–77n for capacitance adjustment and the resonance capacitor 76a are set to about 206 pF, the capacitors 77a–77n for capacitance adjustment can be neglected.

On the other hand, if the closed switches 78a–78n are opened in order, since the total capacitance of the capacitors 77a–77n for capacitance adjustment becomes small gradually, the total capacitance of the capacitors 77a–77n for capacitance adjustment with the closed switches 78a–78n and the resonance capacitor 76a also becomes to small gradually.

In addition, at the manufacturing, it is preferable for each capacitors 77a–77n for capacitance adjustment that the capacitance is changed respectively, and the capacitance is set up to according to the amount of shifts of a resonance frequency by overlapping of the tags 71, but the capacitance is also set up identically.

Moreover, in the present embodiment form, although the capacitors 77a–77n for capacitance adjustment and the control circuit 25 are equipped out side of the RFID device 76, the capacitors for capacity adjustment and the control circuit can be also equipped inside of the RFID device.

It is constituted identically to the first embodiment form except the above-mentioned matter.

Thus, an example of a system by which a constituted tag is identified, is explained.

Before the control circuit 25 operates, since the all switches 78a–78n of each overlapped tag 71 is closed, if these tags 71 are overlapped and oscillate with the radio wave of a predetermined frequency from an interrogator, as the same with the first embodiment form, a mutual inductance arises between the antenna coils 74 of each tag 71, and a resonance frequency of each tag 71 changes.

That is, since the self inductance of each tag 71 changes with the mutual inductance of each tag 71, a inductive electromotive force generated to the both ends of the antenna coil 74 becomes to be insufficient to activate the RFID element 76.

However, even if each tag 71 does not resonate, since a certain amount of voltage VAB occurs among A-B of each tag 71 (FIG. 8), the voltage is accumulated to drive the control circuit 25.

The interrogator communicates with one tag 71 among two or more tags 71.

In the memory of the control circuit 25 (not shown), the minimum voltage V0 between A-B by which the tag 71 is activated, that is, the minimum voltage V0 between A-B when the tag 71 resonates, is memorized.

The control circuit 25 compares the signal (actual voltage VAB between A-B) and the voltage V0 from the modulation/demodulation logic part 23, if it becomes to VAB<V0, and decreases the total capacitance of the capacitors 77a–77n for capacitance adjustment by opening the switch sequentially from the switch 78a to the switch 78n in order.

And when it is set to VAB>=V0, the control circuit 25 suspends the on-off controls of the switches 78a–78n.

At this time, the tag 71 resonates with a radio wave which the interrogator oscillates.

The interrogator, as the same with the first embodiment form, after reading the peculiar information memorized in the memory of the RFID element 76 of the resonating tag 71, writes a predetermined matter in the memory.

If the writing in the memory of the tag 71 is completed, a signal is sent to the control circuit 25 from the modulation/demodulation logic part 23 of the tag 71 and it is set up to be the first state by closing the switches 78a–78n altogether.

Next, the interrogator communicates with another tag by the above-mentioned procedure, if the writing to the memory of the RFID element of the tag is completed, a signal is sent to the control circuit from modulation/demodulation logic part of the tag and it is set up to be the first state.

Thus, all the overlapped tags 71 are identified one by one for a short time.

In addition, all the switches of the tags whose communications are completed, may be change into the state where they are opened.

In addition, in the present embodiment form, a metal plate such as a coin may be enclosed with an envelope which is an article.

In this case, although a resonance frequency of each tag changes to the value different from the above-mentioned value, since the control circuit decreases the total capacitance of the capacitor for capacity adjustment by opening every switch of each tag in order, when the voltage between A-B is set to VAB≧V0, the tag resonates with a radio wave which the interrogator 27 oscillates.

Figure 9:
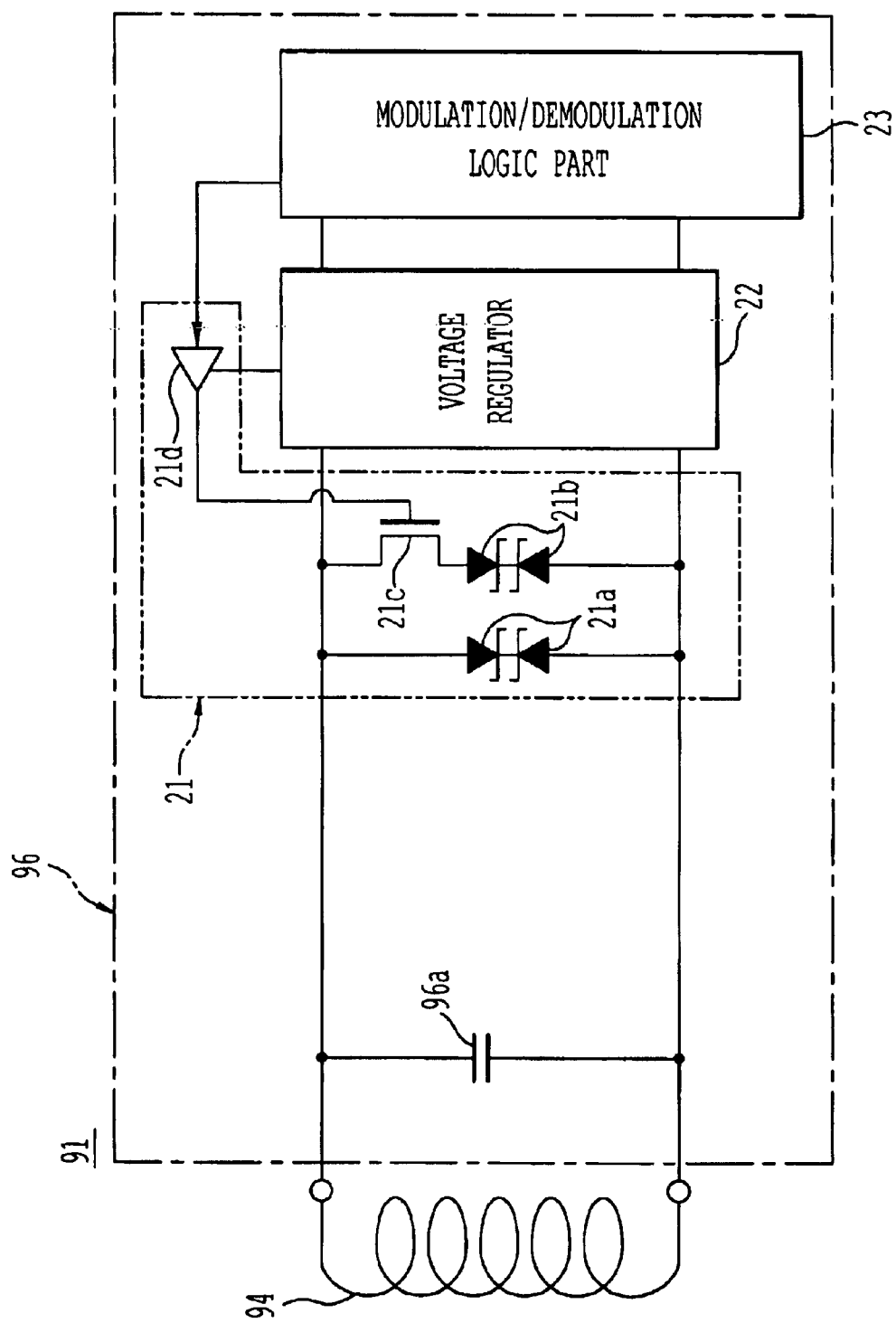
FIG. 9 shows a circuit corresponding to the fifth embodiment of the present invention.

FIG. 9 shows the fifth embodiment form of the present invention.

In FIG. 9, the same marks as FIG. 1 show the same parts.

In the present embodiment form, a tag 91 is equipped with an antenna coil 94 for overlapping and a RFID element 96 for overlapping which the antenna coil 94 for overlapping is connected to and a capacitor 96a for overlapping is built in.

When the tags 91 are overlapped at predetermined number of sheets, for example ten sheets, either or both of the inductance of the antenna coil 94 for overlapping and the capacitance of capacitor 96a for overlapping is/are set up so that a resonance frequency of each of the tags 91 is identically to be a resonance frequency of the un-overlapped single tag 91.

Thus, with the constituted tag, when only predetermined number of sheets of tag 91 are overlapped beforehand, since an inductance of the antenna coil 94 for overlapping and a capacitance of capacitor 96a for overlapping are adjusted so that each tag 91 resonates, if the interrogator oscillates a radio wave of predetermined frequency to the tag 91 overlapped only predetermined number of sheets, each tag 91 resonates, respectively.

Consequently, the interrogator can identifies each tag 91 certainly by communicating one by one with each above-mentioned tag 91 resonating and activating.

In addition, with the antenna coil for overlapping and RFID device for overlapping, an antenna coil for independence and a RFID device for independence, which resonate when the tag is not overlapped, can be equipped with the tag.

In this case, when the tag is independent, since a resonance circuit for independence comprising the antenna coil for independence and a capacitor for independence built in the RFID device for independence, tag is oscillated, and identified.

On the other hand, when tags are overlapped, since the resonance circuit for overlapping comprising the antenna coil for overlapping and the capacitor for overlapping, the tag is oscillated and identified.

Moreover, in the above-mentioned third to fifth embodiment forms, the tag of the second embodiment form, namely, the tag is comprised with a magnetic material and a main part of a coil, can be used.

AVAILABILITY ON INDUSTRY

As stapulated above, according to the present invention, since it is constitute so that a resonance frequency of a resonance circuit comprising an antenna coil and two or more resonance capacitors can be changed, by connecting the resonance capacitors in parallel with the antenna coil and in parallel with each other, connecting two or more switches to the resonance capacitors, respectively, furthermore, operating on-off controls of the switches by a control circuit, even if resonance frequency of each tag changes by overlapping two or more tags, or a tag and a metal plate, by changing total capacitance of the resonance capacitors, resonance frequency of the resonance circuit comprising the antenna coil and the resonance capacitor with the closed switch of each tag can be set up to be almost the same with that of the resonance frequency of the un-overlapped tag.

Consequently, since the tag resonates and is activated, the tag is identified. Thus, each tag is identified one by one for a short time.

Moreover, if it is constituted so that resonance frequency of the resonance circuit comprising an antenna coil and a resonance capacitor in the RFID device, can be changed, by connecting ends of two or more leads to a winding of the antenna coil with predetermined intervals and the other ends to a RFID device, having two or more switches in the leads, furthermore, closing arbitrary switches alternatively by a control circuit, even if a resonance frequency of each tag changes by overlapping two or more tags, or a tag and a metal plate, a resonance frequency of the resonance circuit comprising the antenna coil and the resonance capacitor of each tag can be set up to be almost the same with that of the resonance frequency of the un-overlapped single tag by changing the inductance of the antenna coil.

Consequently, since the tag resonates and is activated, the tag is identified. Thus, each tag is identified one by one for a short time.

If it is constituted so that a resonance frequency of a resonance circuit comprising an antenna coil, a capacitor for capacity adjustment and a resonance capacitor can be changed, by connecting two or more capacitors for capacity adjustment to the antenna coil in series and each other in parallel, connecting two or more switches to the capacitors for capacity adjustment, respectively, furthermore, operating on-off controls of the switches by a control circuit, even if resonance frequency of each tag changes by overlapping two or more tags, or tag and metal plate, a resonance frequency of the resonance circuit comprising the antenna coil, the capacitor for capacity adjustment with the closed switch and the resonance capacitor can be set up to be almost the same with that of the resonance frequency of the un-overlapped single tag by changing total capacitance of the capacitor for capacity adjustment.

Consequently, since the tag resonates and is activated, the tag is identified. Thus, each tag is identified one by one for a short time.

Moreover, when predetermined number of tags are overlapped, if one of or both of a capacitance of the inductance of an antenna coil for overlapping and the capacitor for overlapping is/are set up so that a resonance frequency of each overlapped tag becomes the same with that of resonance frequency of the un-overlapped single tag, when an interrogator oscillates a radio wave of a predetermined frequency to the tags overlapped only predetermined number of sheets, each tag resonate, respectively.

Consequently, each above-mentioned tag resonating and activating is certainly identified.

Furthermore, if an antenna coil for independence and a RFID device for independence, which resonate when tag is not overlapped, are equipped with an antenna coil for overlapping and a RFID device for overlapping, when a tag is independent, a tag is identified by resonating resonance circuit for independence comprising the antenna coil for independence and the capacitor for independent built in the RFID device for independence.

On the other hand, when tags are overlapped, the tags are identified by resonating a resonance circuit for overlapping constituted by an antenna coil for overlapping and a capacitor for overlapping.

Consequently, the tags can be identified regardless of whether the tags are overlapped or not.

What is claimed is:

1. An identifying system for overlapped tags, wherein one of said tags comprises:

an antenna coil;

a radio frequency identification device (RFID) connected to the antenna coil;

two or more resonance capacitors connected in parallel to each other and connected in parallel to the antenna coil;

two or more switches that electrically connect the two or more resonance capacitors to the antenna coil and to the RFID; and a control circuit configured to operate on-off controls of the two or more switches to change a resonance frequency of the identifying system.

2. An identifying system for overlapped tags, wherein one of said tags comprises:

an antenna coil;

a radio frequency identification device (RFID) connected to the antenna coil;

at least one resonance capacitor disposed in the RFID;

two or more leads having first ends connected to a winding of the antenna coil at predetermined intervals on the winding and second ends connected to the RFID;

two or more switches formed in the two or more leads, respectively, that electrically connect the antenna coil and the RFID through the two or more leads; and a control circuit configured to alternately close the two or more switches to change a resonance frequency of a resonance circuit including the antenna coil and said at least one resonance capacitor.

3. An identifying system for overlapped tags, wherein one of said tags comprises:

an antenna coil;

a radio frequency identification device (RFID) connected to the antenna coil;

at least one resonance capacitor disposed in the RFID;

two or more adjustment capacitors connected in parallel to each other and connected in series to the antenna coil;

two or more switches connected to the two or more adjustment capacitors, respectively, the two or more switches electrically connecting the two or more adjustment capacitors to the antenna coil and the RFID; and a control circuit configured to operate on-off controls of the two or more switches to change a resonance frequency of a resonance circuit including the antenna coil, said at least one resonance capacitor, and the adjustment capacitors in dependence on operation of said two or more switches.

* * * * *